United States Patent
Inaba et al.

(10) Patent No.: US 6,812,823 B2
(45) Date of Patent: Nov. 2, 2004

(54) UNLOCK OPERATION SYSTEM OF A VEHICLE DOOR

(75) Inventors: Hisashi Inaba, Kariya (JP); Yuichi Murakami, Chiryu (JP); Kiyokazu Ieda, Chiryu (JP); Eiji Mushiake, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 403 days.

(21) Appl. No.: 09/924,611

(22) Filed: Aug. 9, 2001

(65) Prior Publication Data

US 2002/0041225 A1 Apr. 11, 2002

(30) Foreign Application Priority Data

Aug. 9, 2000 (JP) ........................................ 2000-241285
Jul. 26, 2001 (JP) ........................................ 2001-226613

(51) Int. Cl.[7] ................. G05B 19/00; G06F 7/00; G08B 29/00; H04B 1/00; H04L 9/32
(52) U.S. Cl. ................... 340/5.6; 340/5.62; 340/5.72
(58) Field of Search ............................. 340/5.6, 5.61, 340/5.64–5.67, 5.7–5.73, 825.69, 825.72, 10.1, 10.33, 426, 428

(56) References Cited

U.S. PATENT DOCUMENTS 3,914,762 A * 10/1975 Klensch ..................... 340/5.61
4,760,394 A * 7/1988 Takeuchi et al. .......... 340/10.42
5,844,470 A * 12/1998 Garnault et al. ............ 340/5.62
6,304,168 B1 * 10/2001 Ohta et al. .................. 340/5.72
6,525,646 B1 * 2/2003 Bartz ......................... 340/5.72
6,577,228 B1 * 6/2003 Tsuchida et al. ........... 340/5.72

FOREIGN PATENT DOCUMENTS

EP          1 006 028 A2    6/2000
JP          10-308149 A     11/1998

* cited by examiner

*Primary Examiner*—Michael Horabik
*Assistant Examiner*—Nam V Nguyen
(74) *Attorney, Agent, or Firm*—Burns, Doane, Swecker & Mathis, L.L.P.

(57) ABSTRACT

A vehicle door lock system has a lock mechanism for locking or unlocking the vehicle door. A control mechanism for controlling an operation of the lock mechanism includes first and second resonators. The first resonator resonates at a predetermined first value Q for transmitting a first signal to the outside of the vehicle. The second resonator is connected in series with the first resonator and resonates at a second value Q which is greater than the first value Q, and changing a resonant condition in accordance with a change of a capacitance. A single actuator is provided for actuating the first and second resonators. A switching mechanism is provided which utilizes the actuator for alternatively switching actuation between the first and the second resonators. The control mechanism controls the switching operation of the switching mechanism and the operation of the door lock mechanism in accordance with the resonant condition of the second resonator.

5 Claims, 10 Drawing Sheets

UNLOCK OPERATION SYSTEM OF A VEHICLE DOOR

This application is based on and claims priority under 35 U.S.C. § 119 with respect to Japanese Application No. 2000-241285 filed on Aug. 9, 2000 and No. 2001-226613 filed on Jul. 26, 2001, the entire content of which is incorporated herein by reference.

FIELD OF THE INVENTION

The present invention generally relates to an unlock operation system. More particularly, the present invention pertains to an unlock operation system detecting an approach of a vehicle user to a vehicle door for unlocking the door when the user performs a door opening operation.

BACKGROUND OF THE INVENTION

A known system disclosed in EP1006028 detects a condition that a person (i.e., a vehicle user; e.g., a driver) approaches or leaves a vehicle door and automatically locks or unlocks a lock mechanism provided in the vehicle door. The user carries a remote controller. A transmitting circuit, a receiving circuit, and a control portion are disposed in the vehicle. An antenna is disposed in a door handle of the vehicle door. The transmitting circuit transmits a request signal to the remote controller via the antenna. The transmitting circuit includes a resonant circuit. On the contrary, when the remote controller receives the request signal, the remote controller transmits a signal including an ID information to the receiving circuit of the vehicle. The ID information includes an intrinsic ID. The ID information including the intrinsic ID which is received at the receiving circuit and corresponding intrinsic ID memorized in the control portion in advance are compared in the control portion. By judging whether the intrinsic ID's of the remote controller and the control portion match one another, the control portion locks or unlocks a door lock mechanism provided in the vehicle depending upon the user's intention.

A Japanese Patent Laid-Open Publication No. H10-308149 discloses a system that includes a sensor in a door handle of a vehicle door for detecting the approach of a user. This sensor is resonated by a resonant circuit. When the user approaches the vehicle, a capacitance between the user and the vehicle door is changed. The user's action for opening the vehicle door is detected by observing the change of the capacitance.

In order to improve the safety and convenience of the vehicle door lock device, it is preferable to combine the aforementioned two known systems. However, the resonant circuit included in the transmitting circuit and the resonant circuit for resonating a sensor electrode require respective oscillators. Using two oscillators increases the amount of electric current supplied through the oscillators and as is the case with the size of an overall circuit of the system.

In general, electric power is supplied from a battery to a movable body such as vehicle. It is required to detect the approach of the user even when an ignition switch is off such as when the vehicle is parked, in this automatic type of system. In order to use limited battery capacity effectively, it is desirable to restrain the electric power consumption of the system as much as possible.

SUMMARY OF THE INVENTION

It is an object of the present invention to provide an unlock operation system of a vehicle door having control means which can actuate a plurality of resonant circuits effectively.

In order to obtain the foregoing object, the unlock control system for a vehicle door lock mechanism comprises first resonant means resonating at a first value Q for transmitting a first signal to the outside of the vehicle; second resonant means for resonating at a second value Q which is greater than the first value Q, connected in series with the first resonant means and having a capacitance, a resonant condition being changed in accordance with a change of the capacitance; sole actuating means for actuating the first and the second resonant means; and control means for activating the first and the second resonant means alternatively and for unlocking the door lock mechanism in accordance with the change of the resonant condition of the second resonant means.

The effects of the present invention are as follows: Because the first resonant means and the second resonant means are connected in series, an impedance Zon of overall first and second resonant means can be expressed as Zon= $j/\omega C1 \cdot (\omega 2C1L1-1)$ when the switching means is ON; wherein C1 indicates a resonant capacitance of the first resonant means, L1 indicates a resonant inductance, and C2 indicates a resonant capacitance of the second resonant means. When the switching means is OFF, the impedance Zoff of the overall first and second resonant means can be expressed as Zoff=$1/j\omega \cdot (1/C1+1/C2)+j\omega \cdot (L1+L2)$. By making the value Q (Q2) of the second resonant means far greater than the value Q (Q1) showing sharpness of resonance of the first resonant means (i.e., Q1<<Q2), the inductance L2 becomes far greater than inductance L1. Because the first and second resonant means share the single actuating means, the frequency thereof is constant, and accordingly the capacitance C1 becomes far greater than C2 (i.e., C1>>C2). When the switching means is OFF, the impedance Zoff of the overall resonant circuit can be approximated as Zoff=$j/\omega C2 \cdot (\omega 2C2L2-1)$. The impedance Zoff obtained by the above formula is presumed to be the same as a resonant circuit formed by C2L2 when the switching element is OFF. On the other hand, when the switching element is ON, the impedance Zon of the overall resonant circuit becomes Zon=$j/\omega C1 \cdot (\omega 2C1L1-1)$ to be a resonant circuit of C1L1. Accordingly, when the switching means is ON, only the impedance of the first resonant means exists and when the switching means is OFF, only the impedance of the second resonant means exists. That is, even when the first resonant means and the second resonant means are connected in series and actuated by the single actuating means, one of the impedance of the resonant means can be negligible and the other resonant means is not affected by the resonant condition of one of the resonant means.

BRIEF DESCRIPTION OF THE DRAWING FIGURES

The forgoing and additional features and characteristics of the present invention will become more apparent from the following detailed description considered with reference to the accompanying drawing figures in which like reference numerals designate like elements and wherein.

DETAILED DESCRIPTION OF A PREFERRED EMBODIMENT OF THE INVENTION

Figure 1:
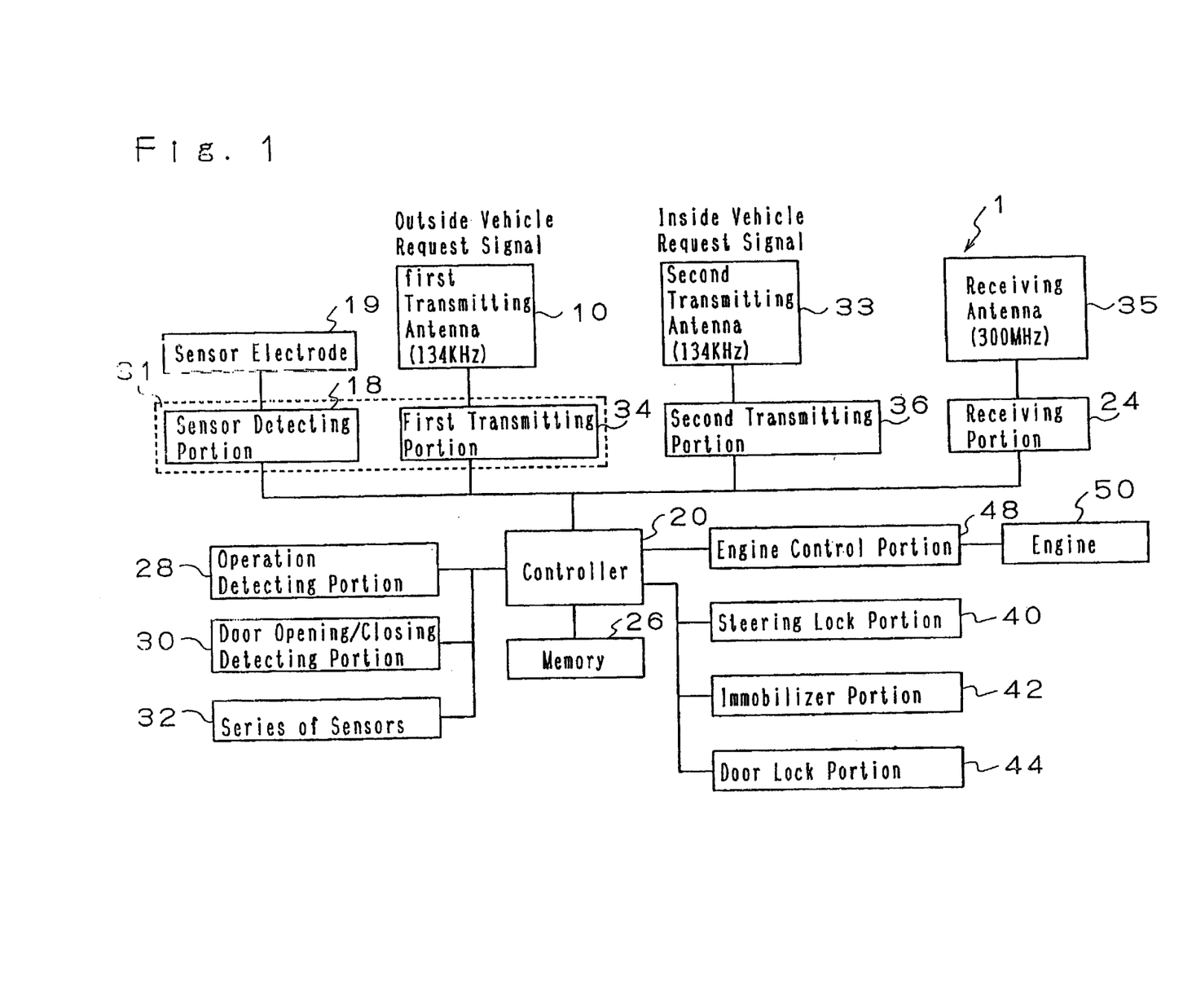
FIG. 1 is a system block view of an unlock operation system of a vehicle door on vehicle side according to an embodiment of the present invention.

An embodiment of the present invention will be explained referring to drawings. FIG. 1 is a block diagram of a system 1. The system 1 is disposed in a vehicle. The system 1 is operable to lock/unlock a door lock mechanism (i.e., door lock portion 44) when a person (i.e., a user of the vehicle; e.g., a driver; hereinafter called "user") who carries a remote controller 60 approaches or leaves the vehicle. It is thus not necessary for the user to operate a key for locking/unlocking the door lock mechanism. The locking/unlocking of the door lock mechanism is performed by interacting the communication between the system 1 and the remote controller 60 based on an intention of the user. The user's intention means that the user wants to open a vehicle door 3 (shown in FIG. 10). The door lock mechanism is provided in the vehicle door 3.

Figure 3:
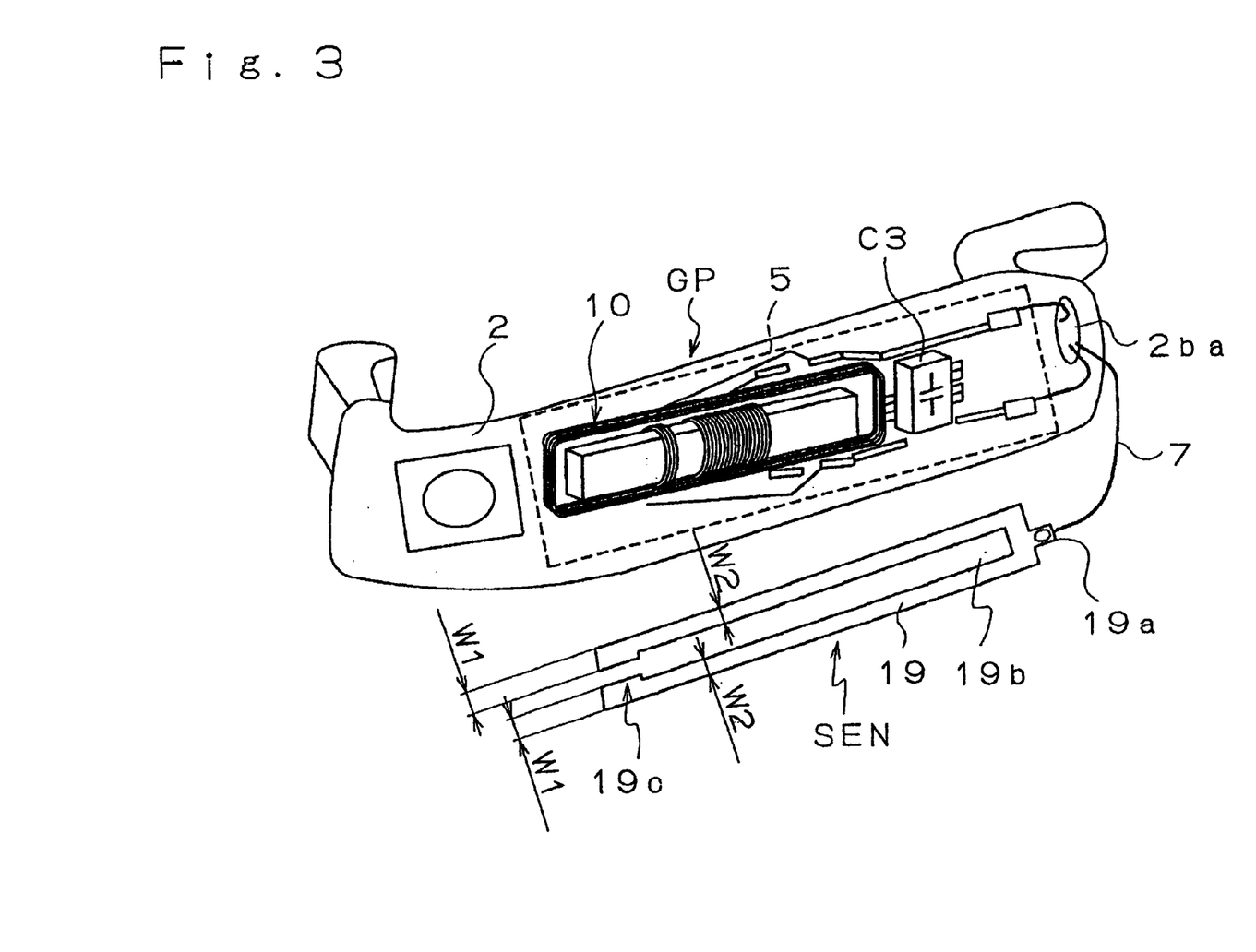
FIG. 3 is a perspective view of a door handle according to the embodiment of the present invention.
Figure 4:
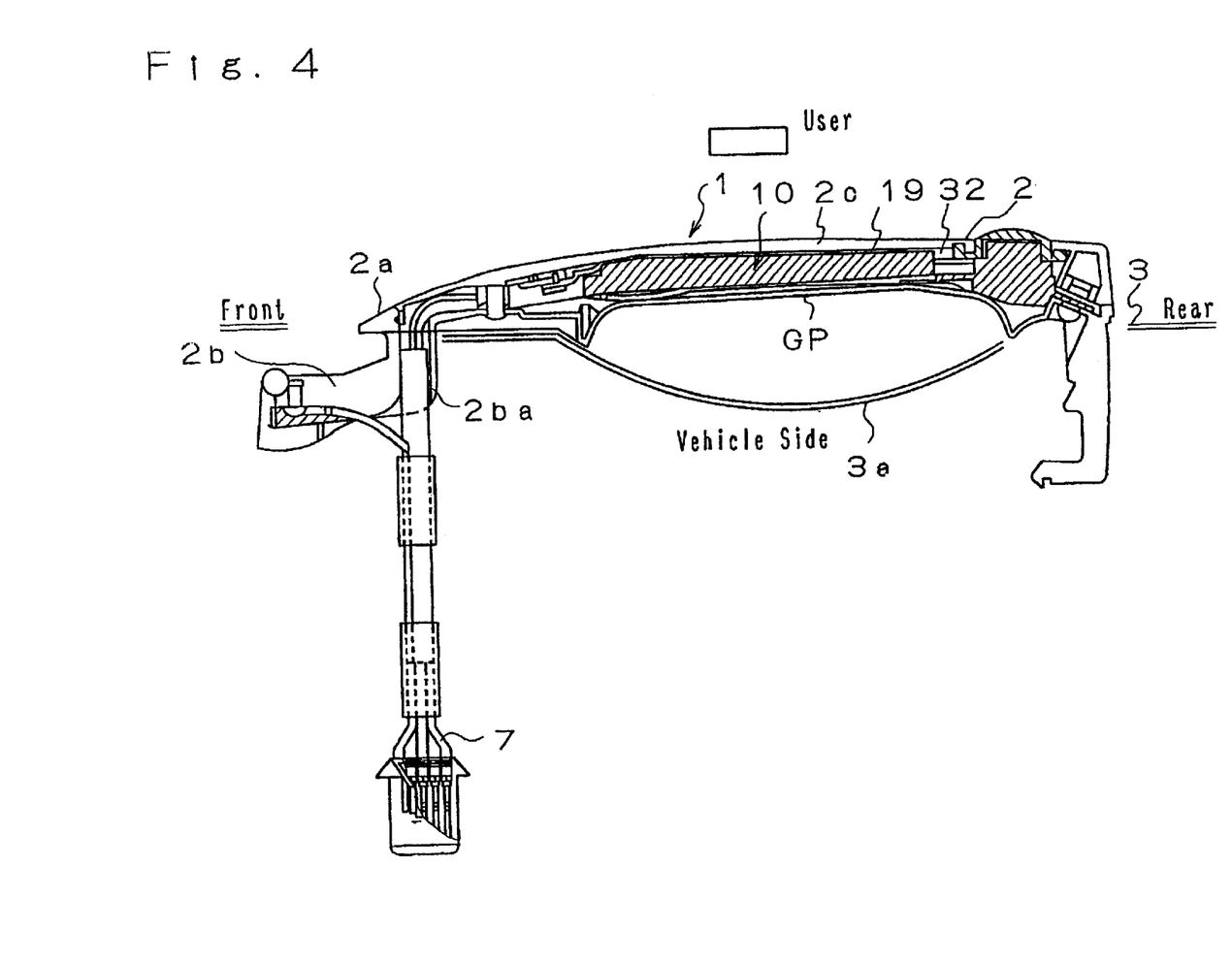
FIG. 4 is a cross-sectional view of the door handle according to the embodiment of the present invention shown in FIG. 3.
Figure 10:
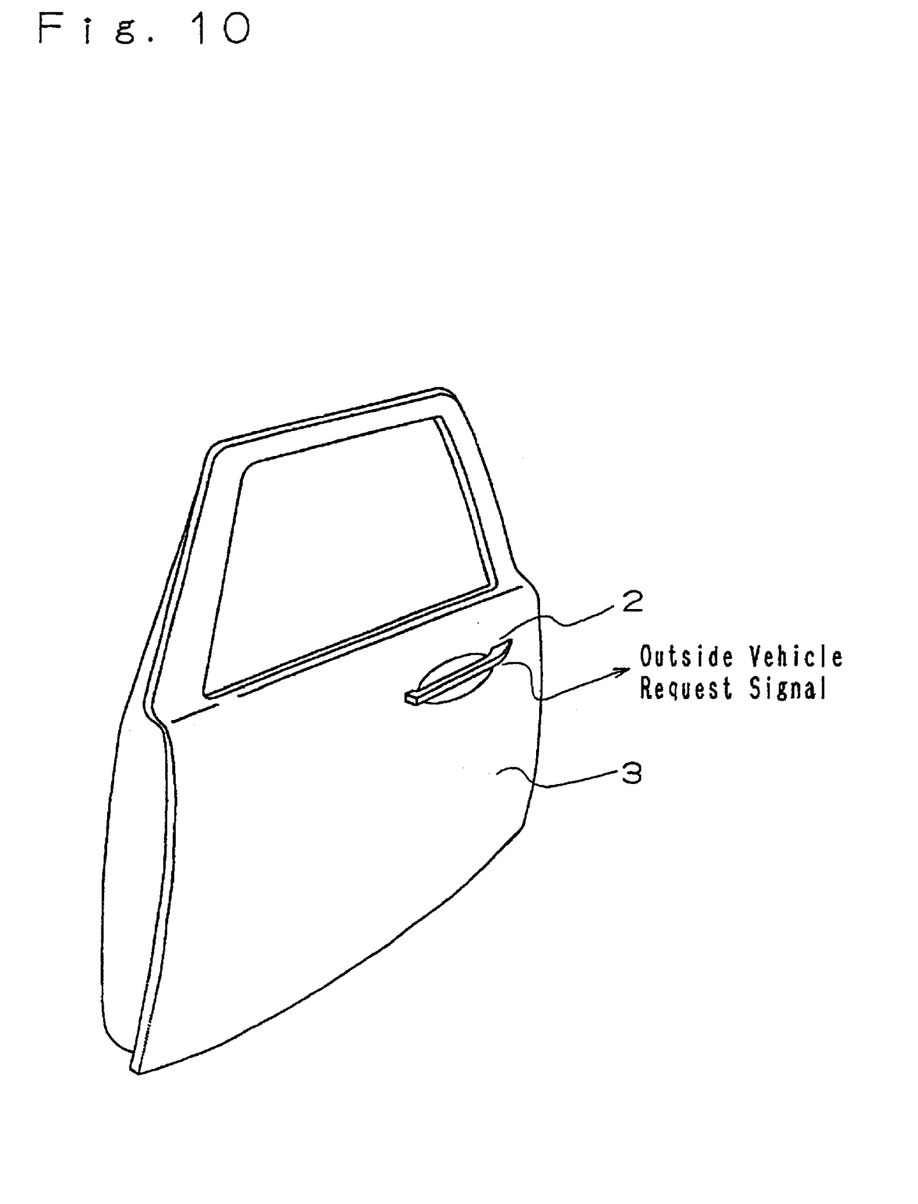
FIG. 10 is an external view of a vehicle door.

The vehicle includes a first transmitting antenna (i.e., outside vehicle antenna) 10 and a second transmitting antenna (i.e., inside vehicle antenna) 33 which communicate with the remote controller 60. As shown in FIGS. 3, 4, and 10, the first transmitting antenna 10 is disposed in a door handle 2 provided on the vehicle door 3. The second transmitting antenna 33 is disposed in an instrument panel in the interior of the vehicle. The first transmitting antenna 10 is connected to a first transmitting portion 34 while the second transmitting antenna 33 is connected to a second transmitting portion 36. The first and second transmitting portions are connected to a controller 20. The controller 20 transmits, for example, a first request signal, i.e., an outside vehicle request signal (more specifically, an outside-originating vehicle request signal), of 134 kHz to the remote controller 60 via the first transmitting portion 34 and the first transmitting antenna 10. Likewise, the controller 20 transmits, for example, a second request signal, i.e., an inside vehicle signal (more specifically, an inside-originating vehicle signal), of 134 kHz to the remote controller 60 via the second transmitting portion 36 and the second transmitting antenna 33.

A sensor electrode 19 for detecting the approach of the user relative to the vehicle door 3 is connected to a sensor detecting portion 18. The sensor detecting portion 18 is connected to the controller 20. The sensor detecting portion 18 detects the approach of the user based on the information from the sensor electrode 19. The sensor detecting portion 18 and the first transmitting portion 34 are unitary formed and disposed in an outside transmitter 31. The outside transmitter 31 is disposed inside of the vehicle door 3. The sensor detecting portion 18 and the first transmitting portion 34 could instead comprise mutually separated members.

A receiving antenna 35 is provided in the vehicle. The receiving antenna 35 receives, for example, an ID information of 300 MHZ which is transmitted from the remote controller 60. This ID information is inputted into the controller 20 after being demodulated in a receiving portion 24. The controller 20 has a function to memorize codes such as a first code for locking a door, a second code for starting the engine, and an ID code of transponder in a memory 26 even when the power source of the vehicle is off.

An operation detecting portion 28 connected to the controller 20 detects an operation of an ignition switch. A door opening/closing detecting portion 30 such as a courtesy switch detects the opening/closing of the door. A series of sensors 32 detects a vehicle speed and the opening/closing of a window. The controller 20 is connected with a steering lock portion 40, an immobilizer portion 42, a door lock portion 44, and an engine control portion 48. The steering lock portion 40 mechanically locks the steering operation. The immobilizer portion 42 prohibits a fuel supply to the engine 50 and prohibits an ignition operation under illegal use. The door lock portion 44 indicates a door lock mechanism for locking or unlocking all doors 3. The engine control portion 48 performs an engine control of the engine 50 of the vehicle.

Figure 2:
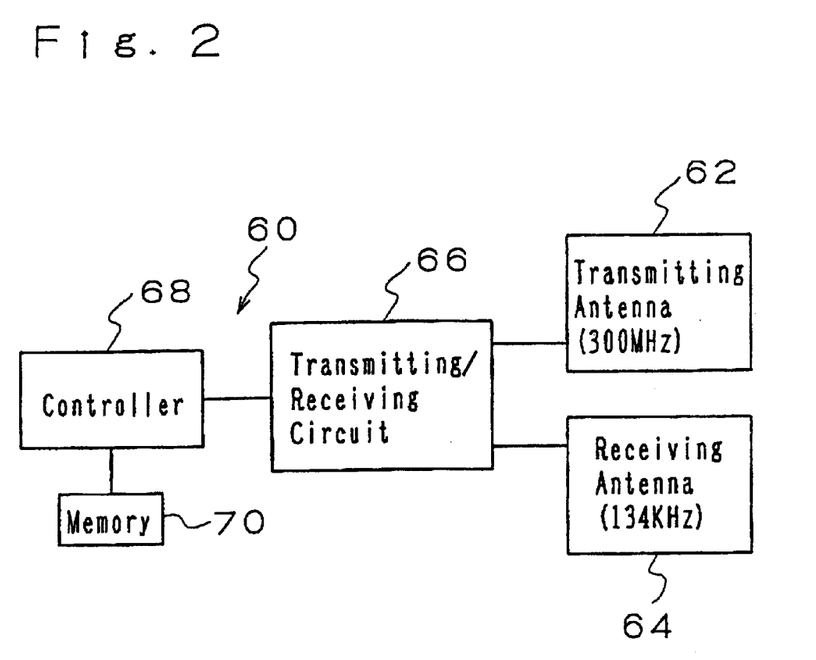
FIG. 2 is a block diagram of a remote controller that a user carries according to the system shown in FIG. 1.

FIG. 2 shows a block diagram of the remote controller 60 applied in the system 1. The remote controller 60 includes a transmitting antenna 62 for transmitting an ID information signal and a receiving antenna 64 for receiving the outside vehicle/inside vehicle request signals which are transmitted from the vehicle. The transmitting antenna 62 and the receiving antenna 64 are connected with a transmitting/receiving circuit 66 which is connected with a controller 68.

The outside vehicle/inside vehicle request signals received by the receiving antenna 64 are demodulated in the transmitting/receiving circuit 66 to be inputted into the controller 68. Upon receiving the outside vehicle/inside vehicle request signal inputted from the transmitting/receiving circuit 66, the controller 68 outputs an ID information signal including first and the second codes to the transmitting/receiving circuit 66. The ID information signal is modulated in the transmitting/receiving circuit 66 and transmitted to the vehicle via the transmitting antenna 62. Each of the first and second codes includes the ID information memorized in a memory 70. The receiving antenna 35 is equipped on a rear view mirror in the vehicle. The ID information signal received in the receiving antenna 35 is inputted into the controller 20 after being demodulated in the receiving portion 24. Accordingly, the first and second codes which are transmitted by the remote controller 60 are inputted into the controller 20.

Referring to FIGS. 3, 4, and 10, the door handle 2 equipped on the vehicle door 3 will be explained as follows. The door handle 2 can be made of metal while projecting outwardly in a vehicle width direction. The door handle 2 is pivotally supported by the vehicle door 3 and has an arm 2b serving as a fulcrum. The arm 2b extends into the vehicle door 3 from a base portion 2a of the handle. The vehicle door 3 can be opened when the user manually grips a grip portion GP provided in a central portion of the door handle 2 and operates the grip GP in an opening direction (i.e., outwardly in the vehicle width direction). The base portion 2a of the door handle 2 is gradually curved towards the front portion for the purpose of improving the handle's appearance. The door handle 2 is made from die cast metal such as zinc and the outer surface thereof is plated with chrome. The metal door handle 2 has an opening 32 formed in an outside portion thereof. The first antenna 10 is disposed in a resin case 5 provided in the opening 32. The opening 32 is covered by a door handle cover 2c which can be made of resin so that the function of the first antenna 10 disposed in the door handle 2 is not affected when the handle is exposed to wind and rain.

A biaxial loop antenna serving as the first antenna 10 is disposed in the resin case 5 of the door handle 2. The biaxial loop antenna includes two loop coils (i.e., resonant inductance) L1 and L3 whose winding directions are disposed at right angles one another (see FIG. 5). A loop coil (i.e., resonant inductance) L4 connected with one end of the loop coil L3 is connected with a resonant capacitance C3 for providing the resonance of 134 kHz to the biaxial loop antenna L1, L3. The resonant capacitance C3 is also disposed in the resin case 5. The elongated resin case 5 has an opening in one face thereof. Although a grip type handle is applied as the door handle 2 in this embodiment, the type of the handle is not limited and any other type of grip may be applied as long as it is manually operable by the user.

The first antenna 10 is connected to the outside transmitter 31 disposed between the vehicle door 3 and the door panel via a bore 2ba provided on rear portion (i.e., right side of FIG. 3) of the grip portion GP. Thus, the first antenna 10 can be supplied with electric power therefrom. Regarding the winding manner and the structure of the coil of the first antenna 1, refer to known art disclosed in Japanese Patent Laid-Open Publication No. H11-340734, the disclosure of which is incorporated herein by reference.

The sensor electrode 19 for detecting the approach of the user toward the door handle 2 is disposed opposite to the first antenna 10 (see FIG. 4). The sensor electrode 19 has a form similar to a U-shaped tuning fork. The sensor electrode 19 is made from non-magnetic material which is of high conductivity such as copper and the equivalents. A width of the electrode w1 at an open end 19c of the sensor electrode 19 is larger than a width of electrode w2 disposed at the middle of the sensor electrode 19. A center space 19b of the sensor electrode 19 has a function to prevent the decline of radiation characteristics in outward direction of the first antenna 10. Thus, the vehicle outside request signal can be transmitted further from the first antenna 10 to the remote controller 60 located outside of the vehicle. An end portion 19a of the electrode 19 disposed opposite the open end 19c has a terminal with a bore in the center that is connected to an end portion of a harness 7 which is also connected to the sensor detecting portion 18 (shown in FIG. 1). The harness 7 and the sensor electrode 19 are fixed with staking or soldering. The harness 7 extended from the sensor electrode 19 is connected to the sensor detecting portion 18 of the outside transmitter 31 via the bore 2ba of the door handle 2. An Approximately U-shape portion SEN and the base of the end portion 19a extended from the bottom of the U-shape are covered with a film (not shown). The purpose for covering with film is to prevent the deterioration of detection sensitivity of the sensor electrode 19 due to corrosion effected by rain.

Figure 5:
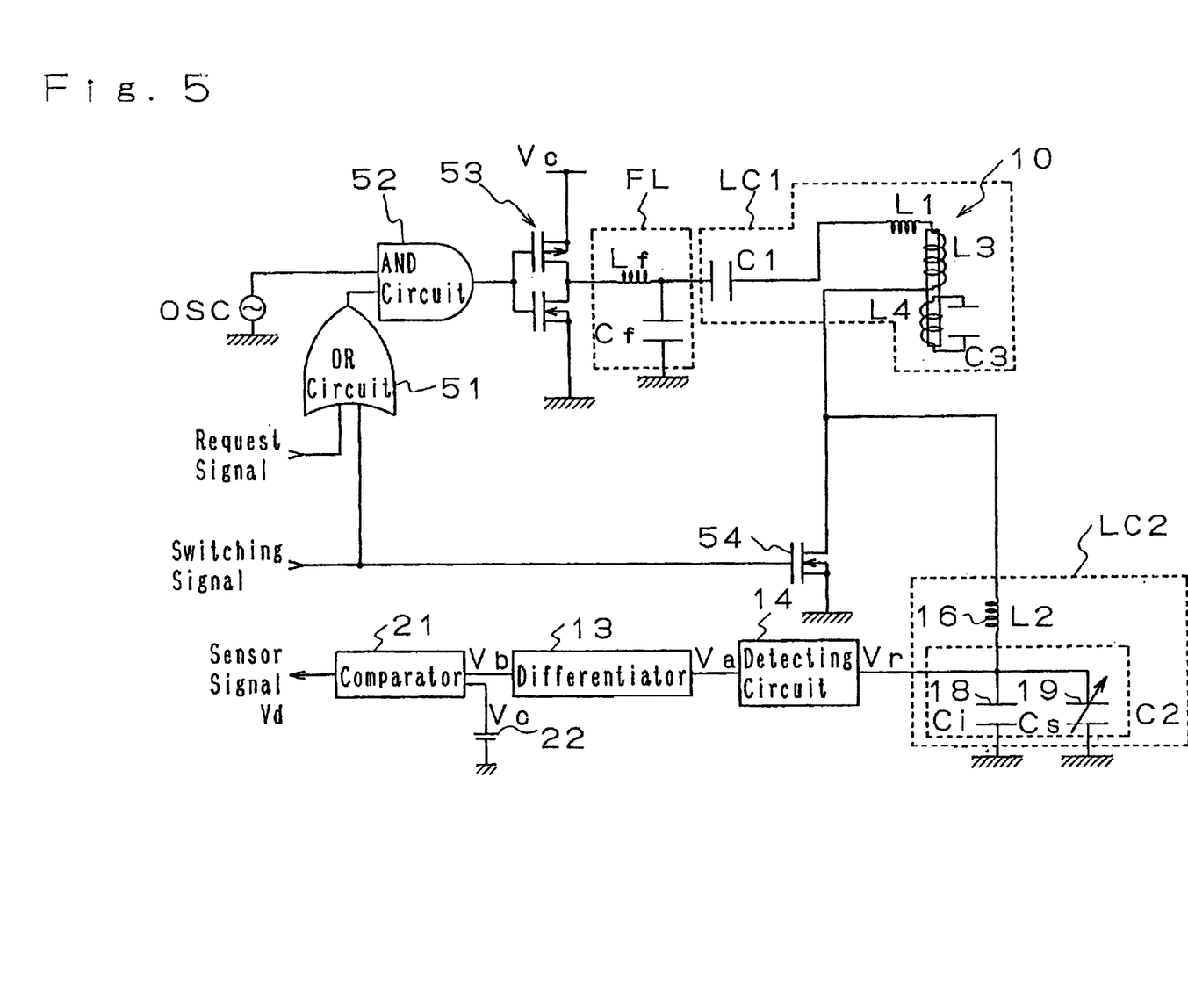
FIG. 5 is a circuit block diagram related with outside transmitter according to the embodiment of the present invention shown in FIG. 1.

Referring to FIG. 5, the first transmitting portion 34 and the sensor detecting portion 18 and surrounding structure of components devices will be explained. Circuits other than the inductance L1, L3, and L4 and the capacitance C3 are provided in the outside transmitter 31. An oscillator OSC which oscillates at frequency f0 (134 KHz) is connected to one input terminal of an AND circuit 52. An output terminal of an OR circuit 51 is connected to the other end of the AND circuit 52. An output terminal of the AND circuit 52 is connected to a driver circuit 53. A request signal and a switching signal outputted from a CPU (not shown) of the controller 20 are respectively inputted into two input terminals of the OR circuit 51. Accordingly, when the controller 20 outputs the request signal or the switching signal while the oscillator OSC is actuated, the AND circuit 52 outputs the outside vehicle request signal by modulating to a carrier wave of 134 KHz.

Whether the user approaches the vehicle is observed by the request signal when the vehicle is stopped. In this case, the ignition switch of the vehicle is OFF. When the switching signal is at a high level, the outside vehicle request signal is transmitted from the first antenna 10 maintaining an interval of a predetermined cycle (i.e., several msec) to observe the approach of the user relative to the vehicle door 3. The remote controller 60 which received the outside vehicle request signal transmits the ID information signal to the vehicle. The ID information signal is received by the receiving antenna 35 and the first and second codes included in the ID information signal are inputted into the controller 20. The controller 20 compares the first and second codes transmitted from the remote controller 60 with the memorized first and second codes. When the transmitted first and second codes agree with the memorized first and second codes, respectively, as a result of the comparison, the controller 20 outputs a low level switching signal. Then, a sensor signal Vd is outputted in accordance with the approach of the user. When the sensor signal Vd is at high level the controller 20 outputs a high level switching signal. In this case, provided that the door lock portions 44 and the systems for detecting the approach of the user are provided in the vehicle doors 3 other than the driver's seat, the outside vehicle request signal is transmitted at a constant cycle and an optional cycle from the optional or all vehicle doors 3 to detect the approach of the user.

The drive circuit 53 outputs the outside vehicle request signal which is modulated to 134 KHz. A filter circuit (i.e., low-pass filter) FL of LC including an inductance Lf and a capacity Cf is connected to the drive circuit 53. A resonant circuit LC1 for transmitting the outside vehicle request signal and a sensor oscillation circuit (i.e., resonant circuit) LC2 are connected to the filter circuit FL in series. The outside vehicle request signal is transmitted from the first transmitting antenna 10 included in the resonant circuit LC1. The resonant circuit LC1 is a series resonance circuit having a resonant capacitance C1, the resonant inductance L1 and L3. The resonant inductance L4 connected to the resonant inductance L3 is connected to the resonant capacitance C3.

The resonant circuit LC2 detects the approach of the user relative to the sensor electrode 19 provided in the door handle 2. When a capacity of the sensor electrode 19 is predetermined as a capacity Cs, and an adjusting capacity of the sensor detecting portion 18 in the outside transmitter 31 is predetermined as Ci, an overall resonant capacitance C2 of the resonant circuit LC2 is the total of the capacity Cs and the capacity Ci. That is, the resonant circuit LC2 is a series resonance circuit formed with an inductance L2 of a resonant coil 16 and the resonant capacitance C2. In the resonant circuit LC2, one end of the resonant capacitance C2 is grounded and a coil end of the resonant coil 16 of the other end of the resonant circuit LC2 is resonated by the oscillation frequency f0 (i.e., 134 KHz). The resonant circuits LC1, LC2 can be switched by a high speed switching element 54 which may consists of FET or transistor. The switching signal is inputted into a gate of the switching element 54. When the switching signal is at a high level, the switching element 54 is ON (i.e., low impedance) and when the switching signal is at a low level, the switching element 54 is OFF (i.e., high impedance).

Figure 7:
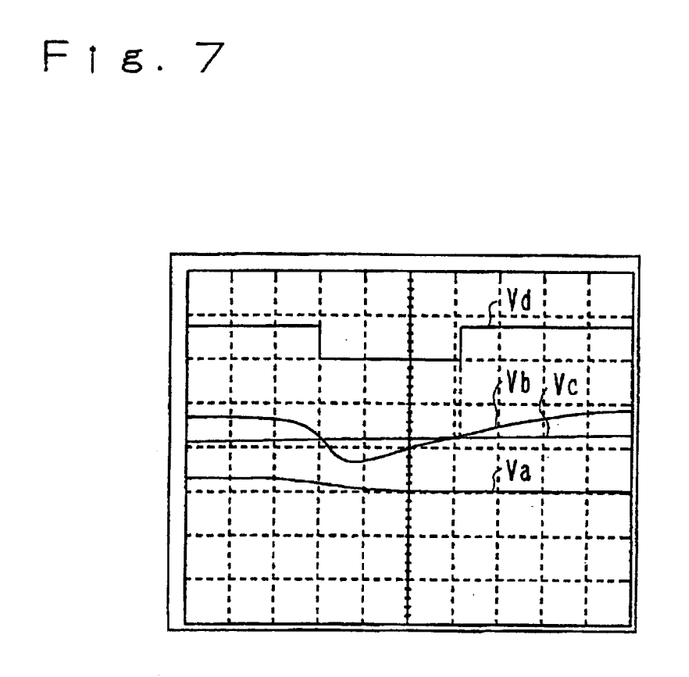
FIG. 7 is a graph showing an output wave of electric voltages Va through Vd shown in FIG. 5.

Referring to FIG. 7, a resonant electric voltage Vr having alternating current (AC) component is generated between the resonant inductance L2 and the resonant capacitance C2 of the resonant circuit LC2. A detecting circuit 14 detects the resonant electric voltage Vr to convert to a detecting electric voltage Va which includes only direct current component. An output terminal of the detecting circuit 14 is connected to a differentiator 13 for detecting the change of the detecting electric voltage Va. The differentiator 13 outputs an electric voltage Vb. An output terminal of the differentiator 13 is connected to one of the terminals (e.g., a non inversion input terminal) of a comparator 21. The other terminal (e.g., inversion input terminal) of the comparator 21 is connected to a standard electric voltage source 22. When the output electric voltage Vb is higher than the standard electric voltage Vc of the standard electric voltage source 22, the output signal of the comparator 21 acting as a sensor signal Vd is switched from low level to high level. On the other hand, when the output electric voltage Vb is lower than the standard electric voltage Vc, the sensor signal Vd is switched from high level to low level.

When the user wants to open the vehicle door 3, the user reaches his/her hand to the grip portion GP of the handle 2, for the purpose of gripping the grip portion GP of the door handle 2, and pulls the grip portion GP in the outward direction of the vehicle. In this case, total capacitance (capacitance between the metal door handle 2 and the sensor electrode 19 and the capacitance between the sensor electrode 19 and its infinity extended line relative thereto) is increased due to the approach of the user. That is, when the user (i.e., usually the fingers or the palm of the user) approaches the sensor electrode 19, further capacitance is generated between the user and the sensor electrode 19 and is added in parallel to the total capacitance that exists when the user is not approaching the sensor electrode 19. Because a distance between the user and the sensor electrode 19 becomes gradually shorter accompanying the approaching of the user to the sensor electrode 19, the capacitance between the user and the sensor electrode 19 is gradually increased. Thus, a change of the capacitance is generated.

The resonant circuit LC2 maintains a constant oscillation at a predetermined resonant frequency fr ($=1/(2\pi\sqrt{LC})$) and at a predetermined resonant electric voltage Vr when the user is not near the sensor electrode 19, wherein L indicates inductance and C indicates capacitance. However, because the capacity C is increased when the user approaches the sensor electrode 19, the resonant frequency fr changes to a frequency fr' which is lower than the resonant frequency fr. When the user approaches the sensor electrode 19 suddenly, the change of the resonant frequency fr is large and the resonant frequency fr is immediately changed to the frequency fr'.

Figure 6:
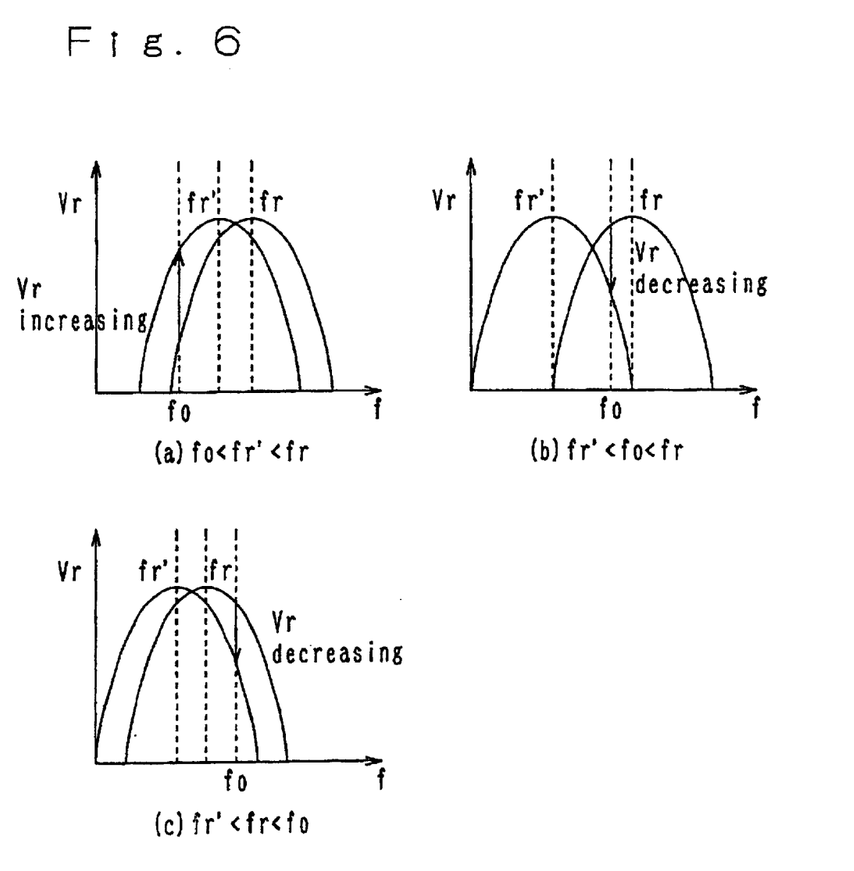
FIG. 6 is a graph showing a change of a resonant voltage at an oscillation frequency fO when a resonant frequency fr is varied (changed) to a resonant frequency fr' in accordance with an approach of a person relative to a sensor electrode of the embodiment of the present invention shown in FIG. 5.

As shown in FIG. 6(a), when the resonant frequency fr is changed to the frequency fr' and when the frequency fr' is greater than the oscillation frequency f0, and the resonant frequency fr is greater than the frequency fr' (i.e., f0<fr'<fr), the resonant electric voltage Vr at the oscillation frequency f0 is increased. On the other hand, when the oscillation frequency f0 is greater than the frequency fr' and the oscillation frequency f0 is greater than the resonant frequency fr (i.e., fr'<f0<fr), the resonant electric voltage Vr at the oscillation frequency f0 is reduced. Provided that the relationship between the resonant frequency fr and the oscillation frequency f0 is not defined, as shown in FIG. 6(a) and (b), the oscillation electric voltage Vr increases and decreases in accordance with the approach of the user to the sensor electrode 19. Hence, as shown in FIG. 6(c), the oscillation frequency f0 is predetermined to be higher than the resonant frequency fr.

That is, when a relationship that the resonant frequency fr is greater than frequency fr' and the oscillation frequency f0 is greater than the resonant frequency fr (i.e., fr'<fr<f0) is predetermined (setup), the oscillation electric voltage Vr is always decreased when the user approaches the sensor electrode 19. That is, when the user approaches the sensor electrode 19, the resonant electric voltage Vr of the AC component declines. The sensor signal Vd is changed from the high level to low level. The controller 20 supplies an unlock signal to the door lock 44 when the door lock portion 44 is in a locked state. Accordingly, the lock of the vehicle door 3 can be automatically released without an unlocking operation using the vehicle key. The vehicle door 3 can be locked by automatically operating the door lock portion 44 when there is no response to the outside vehicle request signal transmitted to the remote controller 60.

Figure 8:
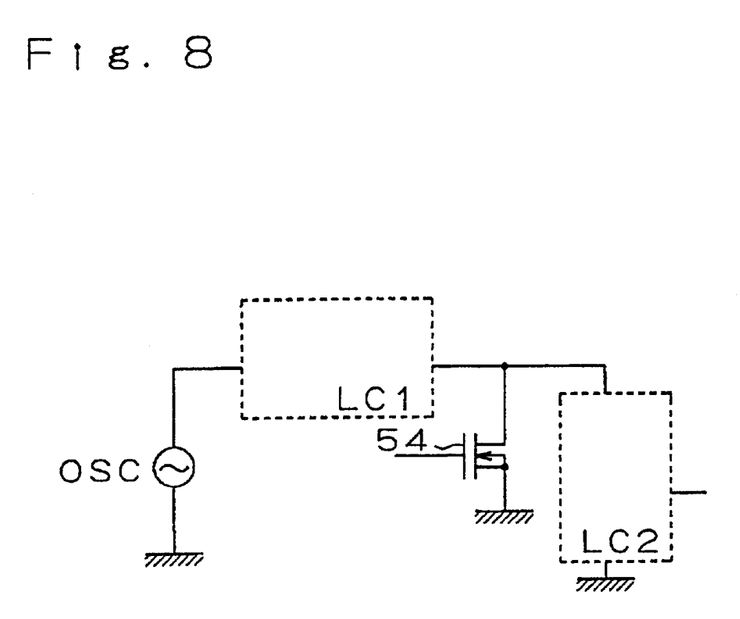
FIG. 8 is a circuit diagram showing a relation between a first and a second resonant means and a switching means shown in FIG. 5.
Figure 9:
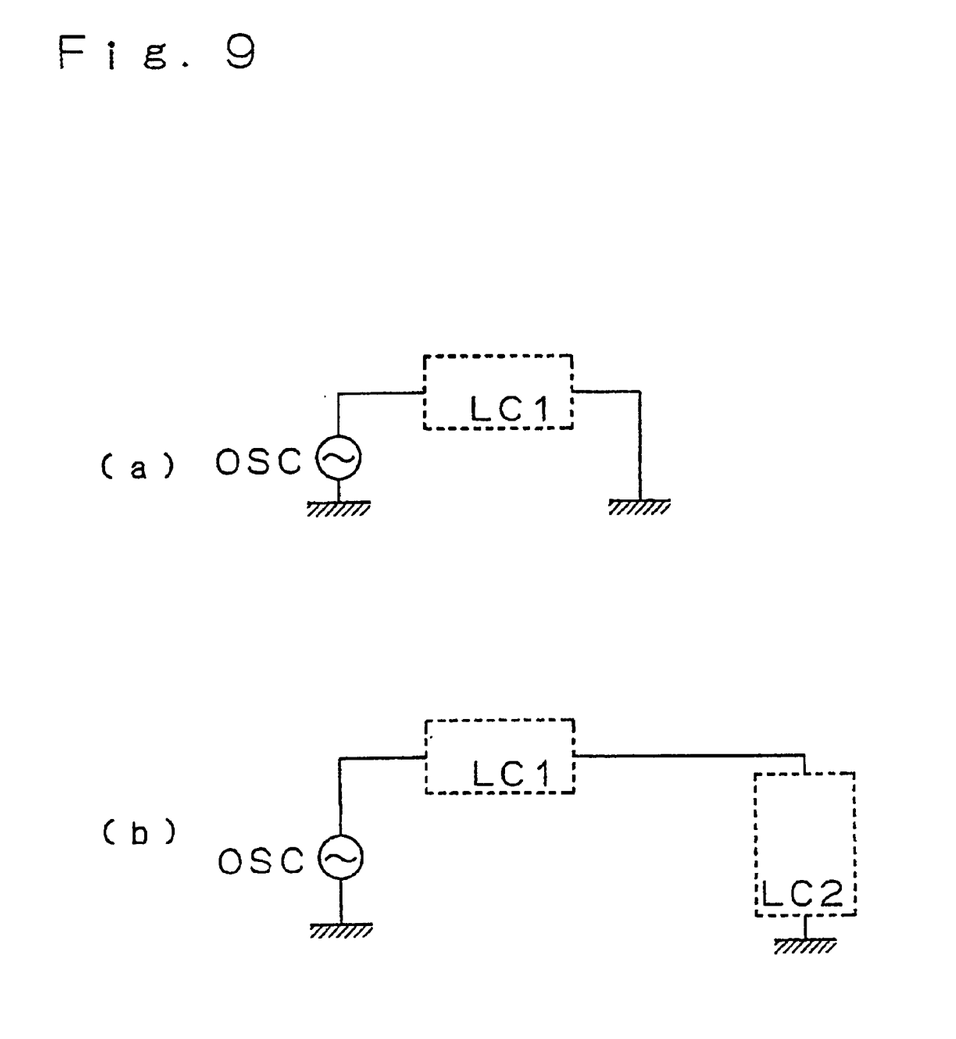
FIG. 9 shows an equivalent circuit following ON/OFF of the switching means shown in FIG. 8.

The operation of the resonant circuits LC1 and LC2 will be explained as follows. FIG. 8 shows a relation between the resonant circuits LC1 and LC2 and the switching element 54 shown in FIG. 5. FIG. 9(a) shows an equivalent circuit when the switching element 54 is ON. FIG. 9(b) shows an equivalent circuit when the switching element is OFF. When the switching element 54 is ON, the overall impedance Zon of the resonant circuits LC1 and LC2 can be obtained as follows:

$$Zon = j/\omega C1 \cdot (\omega 2 C1 L1 - 1)$$

When the switching element 54 is OFF, the overall impedance Zoff of the resonant circuit can be obtained as follows:

$$Zoff = 1/j\omega(1/C1 + 1/C2) + j\omega(L1 + L2)$$

When the value Q (Q1) which shows a sharpness of resonance of the resonant circuit LC1 is far smaller than the value Q (Q2) of the resonant circuit LC2 (i.e., Q1<<Q2), the resonant inductance L1 becomes much smaller than the resonant inductance L2. Because the resonant circuit LC1 and the resonant circuit LC2 share the same oscillator OSC, the oscillation frequency f0 is equal to the resonant frequency fr. The oscillation frequency f0 is constant (134 KHz). Considering the formula, $f0 = \frac{1}{2}\pi\sqrt{LC}$, the resonant capacitance C1 becomes far greater than the resonant capacitance C2 (i.e., C1>>C2).

Accordingly, when the switching element 54 is ON, the impedance Zon of overall resonance becomes as follows. Zon=j/ωC1 (ω2C1L1−1). This corresponds to the resonant circuit of C1L1. On the other hand, when the switching element 54 is OFF, the impedance Zoff of overall resonance becomes as follows. Zoff=j/ωC2 (ω2C2L2−1). This corresponds to the resonant circuit of C2L2. In this case, because the value Q (Q1) of the resonant circuit LC1 and the value Q (Q2) of the resonant circuit LC2 are the same level to parts tolerance in each circuit LC1, LC2 because parts tolerance of the resonant circuits LC1 and LC2 respectively are usually 5 to 10 percent. Provided that the values of Q1, Q2 are different by more than 10 times, the value Q depends on the impedance of only one of the resonant circuits even if the switching element 54 is ON and OFF. Thus, the impedance of one resonant circuit does not affect that of the other resonant circuit.

Accordingly, even when the resonant circuit LC1 and the resonant circuit LC2 are connected in series and are driven to be oscillated by a single oscillator OSC, the impedance of the other resonant circuit can be disregard. This makes it feasible to switch the resonant circuits LC1 and LC2 efficiently by the switching element 54. Because the resonant circuits LC1 and LC2 are driven to be oscillated by a single oscillator OSC, the number of oscillators is reduced, which saves space. In addition, because an oscillator whose electric power consumption is greater than general electric circuit is reduced, a dark current which is supplied to the resonant circuits LC1 and LC2 when the ignition switch is OFF can be reduced. This reduces the electric power consumption when the ignition switch is OFF, and battery failure can be prevented even when the power is supplied from the battery to the resonant circuits LC1 and LC2.

The electric voltage excited to the resonant circuit LC1 after passing through the filter circuit FL has a wave form (e.g., rectangular shaped wave) which includes high frequency component. When a cut-off frequency fc of the filter circuit FL is determined to be greater than f0 and less than 2f0 (i.e., f0<fc<2f0), a wave form close to a basic wave is transmitted from the oscillator OSC to the resonant circuit LC1. When the impedance of the resonant circuit LC1 is determined as an inductive load (R1+X1) at the frequency f0, and the reactance of the capacity Cf of the filter circuit FL is matched to the reactance of the resonant circuit LC1 (−X1), while a resistance component of the resonant circuit LC1 is determined as a resistance component R1 and a reactance of imaginary number portion is determined as a reactance X1, an anti-resonant circuit is formed with the capacity Cf and the resonant circuit LC1.

That is, when a reactance element component of the resonant inductance (i.e., +jXL1) is greater than a reactance element component of the resonant capacitance of the resonant circuit LC1 (i.e., −jXc1) (i.e., jXc1<jXL1), the following relationship is formed. jXL−j(XL1−Xc1). An impedance Zout which corresponds to the filter circuit FL and the resonant circuit LC1 viewed from the oscillator OSC (i.e., the oscillation frequency f0) side is as follows:

$$Zout = \frac{-jXc \cdot (R + jXL)}{(-jXc) + (R + jXL)}$$

$$= \frac{XcX_L - jRXc}{R + j(X_L - Xc)}$$

$$= \frac{R^2 Xc - j\{R^2 Xc + XcX_L(X_L - Xc)\}}{R^2 + (X_L - Xc)^2}$$

In the foregoing formula, the impedance Zout shows a maximum value when XL equals Xc, whereby the circuit electric current supplied through the resonant circuit LC1 can be extremely reduced. In the foregoing manner, the dark current is restrained when the ignition switch is OFF to prevent battery failure.

According to the embodiment of the present invention, by determining the value Q (Q2) of a second resonant circuit greater than the value Q (Q1) of a first resonant circuit, an impedance only for the first resonant circuit exists when a switching element is ON, and an impedance only for the second resonant circuit exists when the switching element is OFF. When the first and second resonant circuits are connected in series to be actuated by a single actuating means, the impedance of one of the resonant circuits can be negligible. This efficiently resonates the first and second resonant circuits. In addition, because the first resonant circuit and the second resonant circuit are actuated by identical actuating means, space can be saved.

In this case, by making the value Q (Q2) of the second resonant circuit more than ten times greater than the value Q (Q1) of the first resonant circuit, the influence of the other resonant circuit can be substantially neglected.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the apart and the scope of the present invention as defined in the claims, be embraced thereby.

What is claimed is:

1. An unlock control system for a vehicle door lock mechanism comprising:

first resonant means resonating at a first value Q for transmitting a first signal to the outside of the vehicle;

second resonant means for resonating at a second value Q which is greater than the first value Q, the second resonant means connected in series with the first resonant means and having a capacitance, wherein a resonant condition being changed in accordance with a change of the capacitance;

sole actuating means for actuating the first and second resonant means; and control means for activating the first and second resonant means alternatively and for unlocking the door lock mechanism in accordance with a change of the resonant condition of the second resonant means.

2. The unlock control system according to claim 1 further comprising:

a receiving means for receiving a second signal in reply to the first signal, from outside of the vehicle; wherein the control means activates the second resonant means instead of the first resonant means when the receiving means receives the second signal.

3. The unlock control system according to claim 1, wherein the second Q value is at least ten times greater than the first Q value.

4. An unlock control system for a vehicle door lock mechanism comprising:

first resonant means for transmitting a signal to the outside of the vehicle;

second resonant means connected in series with the first resonant means and having a capacitance, wherein a resonant condition of the second resonant means being changed in accordance with a change of the capacitance; and control means for activating the first resonant means firstly and the second resonant means alternatively when the control means receives a reply to the signal, and for unlocking the door lock mechanism in accordance with a change of the resonant condition of the second resonant means.

5. The unlock control system according to claim 4, wherein the first resonant means resonates at a first value Q and the second resonant means resonates at a second value Q which is greater than the first value Q.

* * * * *